Patented Mar. 6, 1934

1,950,315

UNITED STATES PATENT OFFICE 1,950,315

DISINFECTANT COMPOSITION

Georg Lockemann and Otto Gerngross, Berlin-Grunewald, Kurt Rülke, Berlin-Charlottenburg, and Werner Ulrich, Berlin, Germany No Drawing. Application September 22, 1931, Serial No. 564,460. In Germany June 3, 1930

12 Claims. (Cl. 167—14)

This invention relates to disinfectants and has for its main object to provide for a non-poisonous, odorless cheap and simple composition which has a strong disinfecting power and can be used for all purposes.

A further object of the invention is to increase the disinfectant power of acid reacting substances, so that they can be used in low concentrations, thus avoiding the disadvantages due to their acid reaction.

We have found that the disinfecting power of acid reacting substances, such as acids, acid reacting compounds and substances, the aqueous solutions of which react acid by hydrolysis, is highly increased by the addition of thiocyanogen compounds such as thiocyanates. Disinfecting compositions containing or consisting of acid reacting compounds and thiocyanogen compounds, which have an extraordinary high disinfecting power, can therefore be successfully employed in all cases and even in those cases, where other disinfectants are not active or afford an exceedingly long treatment, which makes their employment practically impossible. Thus for example the new disinfectant compositions can be used for killing anthrax and tetanus bacillus in a very short time, which is not possible with the known disinfectants. The new disinfectants can also be employed for technical disinfection such as in the manufacture of catgut. They have been successfully used in the disinfection of railroad cars, houses, apartments, stables, floors, furniture, clothes, linen and the like. They can be employed for disinfecting gases, such as air, or in inhalation apparatus, in which cases it is of advantage to use them in a finely distributed state. The new disinfectant compositions are also useful for the disinfection on human or animal bodies, such as hands, face and the like, for combating animal diseases, for disinfecting plants, seeds and the like. They can furthermore be employed as disinfecting or preserving agents in the industry of human food, such as in breweries, in the manufacture of canned meat, fish, vegetables, fruits and the like, in disinfection of water, fruit juices and the like and in other industries for example for the preservation of glue, paste, size and the like.

The acid reacting compounds in the disinfectant compositions can be acids, such as sulfuric, hydrochloric, acetic, citric, tartaric, salycylic acid and the like, or acid reacting salts, such as sodium or potassium bisulfate, or compounds reacting acid by hydrolysis such as sodium oxalate, thiocyanic acid, betain thiocyanate, or pyridine betain thiocyanate. The thiocyanogen compounds in the disinfectant compositions can be thiocyanates such as alkali-metal thiocyanates, ammonium thiocyanate, magnesium thiocyanate, earth-alkali-metal thiocyanates and the like.

Examples (1) Slotted intestine of mutton infected by tetanus bacilli is treated with an aqueous solution of 40 g. of sodium thiocyanate and 20 g. of hydrochloric acid per liter. The tetanus bacilli are killed by a treatment of sixty minutes.

(2) An aqueous solution of 3 g. sodium thiocyanate and 3 g. of glacial acetic acid per liter can be successfully employed for disinfecting floors, walls, furniture, railroad cars and the like. This solution kills pathogen germs within 15 minutes. An aqueous solution of 3 g. of sodium thiocyanate and 0,5 g. of crude hydrochloric acid with 30% of HCl in one liter of water acts in the same manner.

(3) 2 g. of sodium thiocyanate and 4 g. of tartaric acid are dissolved in one liter of water. The solution obtained kills bacilli staphylococci and other pathogen germs within 10 and 30 seconds and can be used for disinfecting hands, faces, razors and the like.

(4) A solution of 0,7 g. of sodium thiocyanate and 0,7 g. of glacial acetic acid in one liter of water is successfully employed for disinfecting clothes and linen by simply softening the objects in the solution. Pathogen germs are killed by such a treatment in 4 hours.

(5) A solution of 4 g. of citric acid and 2 g. of sodium thiocyanate in one liter of water kills pathogen germs in 10 to 30 seconds and can be employed for preserving food and drinks of any kind.

We claim:

1. A disinfectant composition containing acid reacting substances and thiocyanogen compounds.

2. A disinfectant composition containing in solution acid reacting substances and thiocyanogen compounds.

3. A disinfectant composition consisting of acid reacting substances and thiocyanogen compounds.

4. A disinfectant composition consisting of a solution of acid reacting substances and thiocyanogen compounds.

5. A disinfectant composition containing acid reacting substances and alkali-metal thiocyanates.

6. A disinfectant composition containing in solution acid reacting substances and alkali-metal-thiocyanates.

7. A disinfectant composition consisting of acid reacting substances and alkali-metal thiocyanates.

8. A disinfectant composition consisting of a solution of acid reacting substances and alkali-metal thiocyanates.

9. A disinfectant composition as set forth in claim 3 in which betain thiocyanate is employed as an acid reacting substance.

10. A disinfectant composition as set forth in claim 3 in which pyridine betain thiocyanate is employed as an acid reacting substance.

11. A disinfectant composition as set forth in claim 3 in which thiocyanic acid is employed as an acid reacting substance.

12. A disinfectant composition comprising an inorganic acid and an alkali metal thiocyanate.

GEORG LOCKEMANN.
OTTO GERNGROSS.
KURT RÜLKE.
WERNER ULRICH.